: 3,824,076
Patented July 16, 1974

3,824,076
LIQUID AMMONIA-CAUSTIC DYE SOLUTION AND DYEING THEREWITH
Hans Ortheil, Spartanburg, S.C., assignor to Kane and Company, Gastonia, N.C.
No Drawing. Filed Sept. 25, 1972, Ser. No. 291,887
Int. Cl. D06p 1/68
U.S. Cl. 8—82          12 Claims

ABSTRACT OF THE DISCLOSURE

A dye system in which materials are bathed in a dyebath formed of a dye dissolved in substantially anhydrous liquid ammonia. A small amount of caustic is added as a fixative and to improve absorption.

---

This invention relates to systems of dyeing or coloring materials and more particularly to new methods of dyeing materials such as proteinaceous, cellulosic and synthetic fibers and sheets.

Dyes are usually applied to fibrous material from aqueous solution, and generally require imbibition periods of many minutes even with heated solutions. Additionally, various dyes capable of dyeing one type of fiber in aqueous solution are ineffective for other types of fiber. A usual classification of dyestuffs is according to their use, and typically will include acid, direct, disperse, naphthol reactive and sulfur dyes.

The usual dyeing systems and the type of fibers for which a dye is particularly useful have heretofore been largely limited to dyeing from aqueous solution. While dyeing from aqueous solution systems may provide reasonably satisfactory dyeings from a standpoint of color tone and dye levelness, such systems have the disadvantage in usually requiring relatively long imbibition times, e.g. typically from about 30 minutes-10 hours or more. As a result, the dye vats, etc., must be relatively large thus increasing capital investment. Furthermore, such systems normally require relatively high dyebath temperatures which may often approach the boiling point of water. Such increases utility costs of operating the system. An additional disadvantage of aqueous systems is pollution from disposal of spent dyeing solutions.

In a few limited instances, dyes had been applied from organic solvents systems such as alcohols or aromatics and the like. However, such systems may require solvent recovery both from an economic standpoint and to avoid pollution. Furthermore, some of the organic solvents currently used may be undesirable from a standpoint of safety, and produce poisonous gases or may be flammable.

One current system of dyeing involves dyeing from liquid ammonia solution according to the method disclosed by Tratnyek, U.S. Pat. 3,666,398. In this method, direct, disperse, naphthol, reactive and sulfur dyes may be dissolved in liquid ammonia and applied to various types of fibers. An advantage of the Tratnyek method is that imbibition time is radically less as compared to dyeing from aqueous systems. Also, in this method dyeing is accomplished at low temperatures, and does not involve the use of costly solvent. On the other hand, in the Tratnyek method dye absorption may occasionally be somewhat low. Also, color fastness, i.e. dye fixation is also occasionally somewhat poor. Whatever it is that effects absorption and color fastness, it poses a problem in the commercial exploitation of the Tratnyek method in certain instances.

It is thus a primary object of the present invention to provide a novel dyebath for dyeing substrate materials. Other objects of the invention are to provide a novel method of improving absorption of dyestuffs applied from liquid ammonia solution, to provide better fixation, and to provide a novel method of dyeing with acid dyes applied from liquid ammonia solution. More specific objects are to provide a novel method of improving absorption of dyestuffs in the process of dyeing according to the Tratnyek U.S. Pat. 3,666,389 and to improve the color fastness of fabric so dyed.

To effect the foregoing and other objects, the present invention generally contemplates the use of a quantity of caustic in a dye system comprising a dyestuff dissolved in substantially anhydrous liquid ammonia.

Other objects of the invention will in part be obvious and will in part appear hereinafter. The invention accordingly comprises the processes involving the several steps and the relation of one or more of such steps with respect to each of the others, and the products possessing the features, properties and relation of elements which are all exemplified in the following detailed disclosure and the scope of the application of which will be indicated in the claims.

In the following detailed description of the present invention, the term "liquid ammonia" refers to ammonia ($NH_3$) in its liquid state, i.e. which boils at about $-33.4°$ C. at 760 Hg pressure, and not to a solution of ammonium hydroxide. However, it will be appreciated that water can be mixed with liquid ammonia in surprisingly large amounts without the water becoming frozen. Even when approximately equal quantities of liquid ammonia and water are mixed, there remains an appreciable quantity of the liquid ammonia in the mixture so long as the mixture is maintained at equilibrium conditions below the boiling point of the liquid ammonia.

As used herein the term "caustic" refers to an inorganic compound which is a relatively strong base (e.g. a metal hydroxide), or is a carbonate. Many caustic compounds are well known in the art among which may be mentioned the hydroxides and carbonates of univalent alkali metals such as lithium, sodium and potassium and of divalent alkaline earth metals such as calcium and magnesium.

Generally, the caustic is dissolved in water to form a solution which is then admixed with liquid ammonia. Since some heat of solution may be generated when the caustic is dissolved in the water, the caustic solution is preferably chilled prior to being admixed with liquid ammonia. Cooling the caustic solution prior to adding it to the liquid ammonia may minimize loss of the liquid ammonia by vaporization. The caustic is preferably added to liquid ammonia in an amount in the proportion of from about 0.01 to 2 parts by weight caustic per 100 parts by weight liquid ammonia to form the dye solvent.

One or more dyestuffs are dissolved in the liquid ammonia-caustic mixture to form a dyebath. Alternatively, all of the dyestuff may be dissolved in the liquid ammonia prior to admixture with caustic, or part of the dyestuff may first be dissolved in the liquid ammonia, then the caustic is admixed and the remainder of the dyestuff, if any, is subsequently mixed with and dissolved in the resulting liquid ammonia-caustic solution. The particular sequence of mixing the caustic, dyestuff and liquid ammonia is generally not very important.

The usable dyes include those dyes which are soluble in liquid ammonia, such as acid, direct, disperse, naphthol, reactive and sulfur types. Vat dyes do not appear to be soluble in liquid ammonia, hence, are considered among the substances not included in the invention. The dyebaths of the present invention are effective for dyeing a wide range of materials to which they are applied, for example, cotton, silk, wool, viscose, rayon, acetate, triacetate, acrylic, modacrylic, nylon, polyester and other natural and synthetic materials. As is now known, certain materials that are not considered dyeable by a particular dye in aqueous or organic solvents, unexpectedly proved to be quite dyeable by that dye in a liquid ammonia dyebath and are equally dyeable in a liquid ammonia-caustic dyebath. For example, direct dyes and reactive dyes, in liquid ammonia, with or without caustic color triacetate deeply. Further, in both liquid ammonia and liquid ammonia-caustic dyebaths, dyeing is generally completed in about 20 seconds or less, although application of the same dye with conventional aqueous systems employs much longer imbibition times and much higher dyebath temperatures.

The depth of shade achieved in the present invention as in the use of liquid ammonia dyebath systems of Tratnyek appears to depend primarily on the concentration of the dyestuff in the liquid ammonia-caustic solution, and not on dwell time of the fibers in the dyebath. Imbibition periods greater than about 20 seconds do not normally materially improve coloration.

That the addition of the caustic to the dyestuff-liquid ammonia systems of Tratnyek is responsible for the unique consequences achieved is quite clear inasmuch as dyebaths prepared from the same dye dissolved in substantially anhydrous liquid ammonia by itself failed to provide comparable results.

The following examples, illustrative of the principles of the present invention, are based upon application of a bath of a dyestuff dissolved in substantially anhydrous liquid ammonia containing a caustic, to a number of different materials as follows: (1) bleached 80 x 80 cotton print cloth; (2) bleached mercerized 80 x 80 cotton print cloth; (3) spun viscose rayon print cloth (high wet modulus) and (4) a multi-fiber test fabric consisting of cloth bands of the following sequence of fibers identified generically, and in some instances by trade name: dull acetate; acrylic (Acrilan 1956); triacetate (Arnel dull); raw cotton; acrylic (Creslan 61), polyester (Dacron 54); polyester (Dacron 64); nylon (Nylon 60); acrylic (Orlon 75); silk; modacrylic (Verel A); viscose; and wool.

Generally in the following examples, in order to compare the effect of adding caustic to a liquid ammonia bath vis-a-vis absorption, each dye was applied to fabric by two different methods: from a liquid ammonia bath, and from a liquid ammonia bath containing caustic. Dye concentrations in the solutions were as indicated with a total fabric-to-liquor ratio of about 20 to 1 in all cases.

The basic procedure was to submerge all swatches of fabric in the dye solution for twenty seconds for ammonia and ammonia-caustic dyeings. Excess ammonia was allowed to evaporate from the treated fabrics at room temperature (about 20° C.) before drying an an oven at 120–130° C. for about 1 to 2 minutes. The dyed fabrics were then usually rinsed or washed in warm water. Rinsing the fabrics was continued until excess dye was removed from the fabrics or until rinse water showed little or no coloring. The fabrics were then dried by ironing.

The swatches of fabric were then repeatedly laundered or drycleaned (depending on the material) to test for color fastness.

EXAMPLE I

Dye: Sirius Red 4B (C.I. No. 28160) (C.I. Direct Red 81).

The Colour Index describes this dye as a polyazo type used for dyeing cotton, silk and wool. It may also be used for direct printing on these fibers.

Anhydrous ammonia application

Prepare the dyebath by dissolving 2 gms. of dye in 100 ml. anhydrous ammonia.

Saturate the fabrics (11.3 gms. total) in the dyebath for 20 seconds. Remove fabrics from dyebath and allow excess ammonia to evaporate at 20° C. Finish drying at 135° C. for about 2 minutes. Rinse in warm water and iron dry as above.

Ammonia-caustic application

Prepare aqueous caustic solution by dissolving 0.2 parts weight of sodium hydroxide in 4.8 parts by weight of distilled water. The caustic solution resulting is chilled to 0° C. and slowly added to liquid anhydrous ammonia to make a solution of 95% by weight liquid ammonia, 4.8% by weight water, and 0.2% by weight sodium hydroxide. Prepare dyebath by dissolving 2 gms. of dye in 100 ml. of the ammonia-caustic mixture. Saturate the fabrics (12.3 gms. total) in the dyebath for about 20 seconds. Remove fabrics from dyebath and dry the fabrics at 20° C. to remove excess ammonia before final drying at 135° C. for about two minutes. Rinse as before and iron dry.

Application of dyestuff from anhydrous liquid ammonia by itself produces intense coloration of Acrilan, cotton and silk. Viscose is dyed in a lighter shade. Creslan and Nylon are stained but not dyed. Application of dyestuff from liquid ammonia-caustic mixture produces intense coloration of Acrilan, triacetate, cotton, silk and viscose. Creslan, Nylon 66, Orlon, Verel and wool are dyed in relatively light shades.

Fabrics are drycleaned repeatedly to test color fastness. Cottons, Dacrons and Nylons are also laundered with synthetic detergent and with soap in hot aqueous solution. Dye fastness of dyeings from the liquid ammonia-caustic mixture are found to be superior to dyeings made from liquid ammonia by itself.

EXAMPLE II

The purpose of this example is to see if dye absorption or color fastness varies with the ratio of caustic-to-ammonia.

Following the procedure described in Example I, mixtures are prepared of the following amounts of caustic in liquid ammonia (all percentages by weight percent):

(A) 0.1% sodium hydroxide, 4.9% water, 95% liquid ammonia
(B) 0.5% sodium hydroxide, 4.5% water, 95% liquid ammonia
(C) 1.0% sodium hydroxide, 4.0% water, 95% liquid ammonia
(D) 2.0% sodium hydroxide, 8.0% water, 90% liquid ammonia
(E) 3.0% sodium hydroxide, 7.0% water, 90% liquid ammonia Swatches of fabric dyed from ammonia, and from the ammonia-caustic mixtures are compared for dye absorption and color fastness. The fabrics dyed from the ammonia-caustic mixture will be found to have improved dye absorption and color fastness over the fabrics dyed from ammonia only.

Prepare dyebaths by dissolving 2 gram portions of Sirius Red 4B (C.I. Direct Red 81) dye in solutions A.

Saturate samples of the fabrics in the dyebaths for about 20 seconds. Remove the fabrics from the dyebath and dry the fabrics at 20° C. to remove excess solvent before final drying at 135° C. for about two minutes. Rinse and wash with detergent as before. Iron dry.

Results

By comparing swatches with those obtained in Example I, one sees that the presence of various amounts of caustic in the liquid ammonia solvent appears to improve dye absorption and color fastness as compared with dyeings made by application from liquid ammonia only. Increasing the amount of caustic up to about 2% by weight does appear to increase dye absorption. Beyond 2% by weight little difference is seen in dye absorption.

EXAMPLE III

The purpose of this Example is to see if other caustic solutions will improve dye absorption and color fastness of dyeings from liquid ammonia.

Following the procedure described in Example I, mixtures are prepared with the following caustic solutions in (A) Aqueous solution of 0.1% lithium hydroxide—1.0%; liquid ammonia—99.0%;
(B) Aqueous solution of 0.1% potassium hydroxide—1.0%; liquid ammonia—99.0%;
(C) Aqueous solution of 0.5% sodium carbonate—1.0%; liquid ammonia—99.0%;
(D) Aqueous solution of 0.5% potassium carbonate—1.0%; liquid ammonia—99.0%.

Prepare dyebaths by dissolving 2 gram portion of Sirius Red 4B (C.I. Direct Red 81) dye in 100 ml. each of mixtures A.

Saturate samples of the fabrics from the dyebaths for about 20 seconds. Remove samples of the fabrics from the dyebaths and dry the fabrics at 20° C. to remove excess ammonia before final drying at 135° C. for about two minutes. Rinse and wash with detergent as before. Iron dry.

Results

By comparing swatches with those obtained in Example I, one will see that dyeings made with solutions A–D have improved dye absorption and color fastness over the dyeing applications from liquid ammonia only.

EXAMPLE IV

Dye: Artisil Blue Green (Sandoz GP) C.I. Disperse Blue 7 (C.I. No. 62500).

Anhydrous ammonia application

Prepare the dyebath with 4.0 gms. of dyestuff in 248 ml. of anhydrous ammonia. The fabrics (13.8 gms. total) are saturated in the dyebath for 20 seconds and then drained and air dried at 20° C. to remove excess ammonia. Final drying is at 135–140° C. for several minutes. Finally, the fabrics are washed and ironed dry as before.

Ammonia-caustic application

Solution of 4.8% water and 0.2% sodium hydroxide in 95% liquid ammonia is prepared following the procedure described in Example I. Prepare dyebath by dissolving 4.2 grams of dye in the 250 ml. of solution. The fabrics (13.6 grams total) are saturated in the dyebath for 20 seconds and then drained and air dried at 20° C. to remove excess ammonia. Final drying is at 135–140° C. for several minutes. Finally, the fabrics are washed and ironed dry as before.

Application of dyestuff from anhydrous liquid ammonia by itself produces intense coloration of Acrilan, cotton and silk.

Creslan, Dacron, Nylon, Viscose and wool are dyed in very light shades.

From caustic-ammonia dyebath Disperse Blue 7 dyes Acrilan, cotton and silk in dark shades. Light shades are obtained for Creslan, Nylon, Viscose and wool but not as light as dyeings from anhydrous liquid ammonia. Dyeings from the ammonia-caustic mixtures are observed to have superior color fastness, as compared to dyeings from liquid ammonia only.

EXAMPLE V

Dye: Procion Brilliant Blue MRS (ICI) (C.I. Reactive Blue 4).

This dye is identified in the Reactive Dye Chart in Textile World, August 1964 as having the following structure:

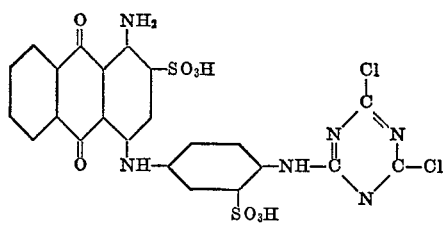

Anhydrous ammonia application

Prepare dyebath with 3.8 gms. of dye in 256 ml. of anhydrous ammonia. Saturate the fabrics (12.3 gms. total) in the dyebath for 20 seconds. Remove fabrics from dyebath, dry off the excess ammonia at 20° C. before final drying at 120° C. for about 1 minute. Rinse, and iron as before.

Ammonia-caustic application

Solution of 0.2% sodium hydroxide and 4.8% water in liquid ammonia is prepared following the procedure of Example I. Prepare dyebath with 3.7 gms. of dye in 244 ml. of the ammonia-caustic solution. Saturate the fabrics (12.3 gms. total) in the dyebath for 20 seconds. Remove fabrics from dyebath, dry off the excess ammonia at 20° C. before final drying at 120° C. for about one minute. Rinse and iron as before.

Results

With both anhydrous ammonia and with ammonia-caustic solution, deep dyeing of Acrilan, cotton and silk is obtained. Cottons and Viscose are also deeply dyed with ammonia-caustic solution, but only lightly dyed with anhydrous ammonia solution. Color fastness of dyeings made from the ammonia-caustic solution will appear superior to color fastness of dyeings from ammonia only.

EXAMPLE VI

Dye: Dykolite Brilliant Orange 3G (Southern Dyestuff Company) (Sulfur Dye).

No Color Index information is available for this dyestuff. The manufacturer describes it as a thiocondensate dye for cellulosic fibers. It is prereduced and is supplied as a powder soluble in water.

Dykolite Brilliant Orange 3G has the following structure according to the article "Dykolite Dyestuffs for Cellulosic Fibers," Weston and Griffin, Textile Chemist and Colorists, 1, No. 22, pp. 67–82, in one isomeric form:

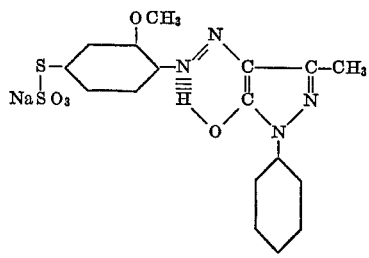

Anhydrous ammonia application

To simplify the dyeing process, the dyestuff and fixative are placed in the same bath.

The dyebath is prepared by dissolving 4.4 gms. of dye and 12 gms. of Dykoset F-40 (the insolubilizing agent for the dye) in about 300 ml. of anhydrous ammonia to make a 1.5% solution of dye. All fabrics (15.4 gms. total) are saturated for about 20 seconds in the dyebath. Air dry the ammonia from the fabrics at 20° C. Briefly wash the fabrics in warm water and iron dry.

Ammonia-caustic application

Prepare solution of 0.2% sodium hydroxide and 5% water in liquid ammonia following the procedure of Example I. Prepare dyebath with 3.5 gms. of dye in 250 ml. of ammonia-caustic solution. The dye does not appear completely soluble. Saturate the fabrics (12.0 gms. total) in the dyebath for 20 seconds. Dry off the excess ammonia at 20° C. before final drying at 120° C. for about 1 minute. Wash and iron as before.

Results

Application of dyestuff from liquid ammonia by itself and from ammonia-caustic mixture produces similar results whereby intense color is imparted to Acrilan, cotton, and silk. Creslan and Viscose are also intensely colored by application of dyestuff from ammonia-caustic solution, but are only stained by application of dyestuff from ammonia only. Dacron and Nylon which are not dyed by application of dyestuff from ammonia by itself are lightly dyed by application of dyestuff from ammonia-caustic mixture.

Dyeings with ammonia-caustic mixture will be observed to have somewhat better color fastness than dyeings from liquid ammonia by itself.

EXAMPLE VII

Dye: Naphthol AS Supra (C.I. Azoic Coupling Component 2) (General Aniline and Film Corp.) Fast Scarlet Salt GGN (C.I. Azoic Diazo Component 3) (General Aniline and Film Corp.) Naphthol dyeing requires two components, the naphthol dye and the developer, to obtain coloring.

The Color Index describes the Azoic Coupling Component 2 (C.I. No. 27505) as 3-hydroxy-2-naphthanilide. It is sparingly soluble in alcohol and insoluble in water. The Azoid Diazo Component 3 bears the Colour Index No. 37010.

Anhydrous ammonia application

Dyeing from a completely anhydrous ammonia system could not be done because the developer was insoluble in the ammonia. However, dyeing was achieved in a two-step process in which the naphthol is dissolved in anhydrous ammonia and the developer in an aqueous solution.

Naphthol AS (4.2 gms.) was dissolved in anhydrous ammonia (272 ml.). The fabrics (14.1 gms. total) were saturated in solution and then allowed to dry at room temperature. Then the fabrics were treated in the developer solution and finished as previously described.

Ammonia-caustic application

Prepare solution of 0.2% sodium hydroxide and 5% water in liquid ammonia following the procedure of Example 1. Dyeing is then achieved in a two-step process in which the naphthol is dissolved in ammonia-caustic mixture and the developer in an aqueous solution.

Naphthol AS (4.4 gms.) is dissolved in anhydrous ammonia-alcohol mixture (298 ml.). The fabrics (14.5 gms. total) are saturated in solution and then allowed to dry at room temperature. Then the fabrics are treated in the developer solution and finished as earlier described.

Using anhydrous ammonia as the solvent for one dye component and water for the other, intentse dyeings of Acrilan, cotton and silk are obtained. Dacron and Nylons are not dyed by this technique. Dyeings from ammonia-caustic mixture will be intense on Acrilan, cotton, silk and viscose. Dacrons and Nylons will be lightly colored. Color fastness of dyeings from ammonia-caustic will be observed to be superior to dyeings from liquid ammonia only.

EXAMPLE VIII

Dye: Nylomine Acid Brown CR (ICI) (C.I. Acid Orange 51) (C.I. No. 26550) (Acid Dye).

Nylomine Acid Brown CR dyes wool and silk directly in an acid bath.

Anhydrous ammonia application

Prepare dyebath with 3.9 gms. of dye in 270 ml. of anhydrous ammonia. Saturate the fabrics (14.3 gms. total) in the dyebath for 20 seconds. Remove fabrics from dyebath, dry off excess ammonia at 20° C. before final drying at 120° C. for about 1 minute. Rinse, iron as before.

Ammonia-caustic application

Solution of 0.2% sodium hydroxide and 4.8% water in liquid ammonia is prepared following the procedure of Example I. Prepare dyebath with 3.5 gms. of dye in 252 ml. of the ammonia-caustic solution. Saturate the fabrics (13.6 gms. total) in the dyebath for 20 seconds. Remove fabrics from dyebath, dry off the excess ammonia at 20° C. before final drying at 120° C. for about one minute. Rinse and iron as before.

Results

Wool and silk are not dyed with liquid ammonia solvent by itself. With ammonia-caustic solution, deep dyeing of wool and silk is obtained.

As appears clearly from the foregoing, dyeing from a liquid ammonia dyebath which contains a caustic offers all the advantages of a novel rapid method of dyeing at low temperatures achieved by the Tratnyek process with the further advantages of improved dye absorption and color fastness. Also, the system may be used advantageously for application of acid dyes.

Since certain changes may be made in the above systems without departing from the scope of the invention herein involved, it is intended that all matter contained in the above description shall be interpreted in an illustrative and not in a limiting sense.

What is claimed is:

1. A dyebath comprising in combination: a body of liquid ammonia having dissolved therein, a dyestuff soluble in liquid ammonia and a caustic.

2. A dyebath as defined in claim 1 wherein said caustic is present in a weight ratio in the range of from about 0.01 to 2 parts by weight for each 100 parts by weight ammonia.

3. A dyebath as defined in claim 1 wherein said caustic comprises an aqueous solution of metal-containing compound selected from the group consisting of a metal hydroxide, and a metal carbonate.

4. A dyebath as defined in claim 1 wherein said caustic comprises an alkali-metal hydroxide selected from the group consisting of lithium hydroxide, sodium hydroxide and potassium hydroxide.

5. A dyebath as defined in claim 1 wherein said caustic comprises a carbonate selected from the group consisting of sodium and potassium carbonates.

6. A dyestuff as defined in claim 1 wherein said dyestuff is selected from the group consisting of acid, direct, disperse, naphthol, reactive and sulfur dyes.

7. In a method of dyeing organic materials by applying to said materials a dyebath of liquid ammonia having a dyestuff dissolved therein, the improvement comprising adding a caustic to said dyebath.

8. In a method as defined in claim 7 wherein said caustic comprises an aqueous solution of a metal-containing compound selected from the group consisting of a metal hydroxide and a metal carbonate.

9. In a method as defined in claim 7 wherein said caustic comprises an alkali-metal hydroxide selected from the group consisting of lithium hydroxide, sodium hydroxide and potassium hydroxide.

10. In a method as defined in claim 7 wherein said caustic comprises a carbonate selected from the group consisting of sodium and potassium carbonates.

11. In a method as defined in claim 7 wherein said caustic is added in an amount of about one-half to two parts by weight of caustic for one hundred parts by weight of ammonia.

12. A method of dyeing organic materials from a dyebath comprising the steps of dissolving a dyestuff and a caustic in liquid ammonia to form said dyebath, and applying said dyebath to said materials.

References Cited

UNITED STATES PATENTS 3,666,398   5/1972   Tratnyek _____ 8—82

DONALD LEVY, Primary Examiner

U.S. Cl. X.R.

8—1 A, 37, 46, 174